US012608242B2

(12) United States Patent

Ojiro et al.

(10) Patent No.: US 12,608,242 B2

(45) Date of Patent: Apr. 21, 2026

(54) MANAGEMENT COMPUTER, MANAGEMENT COMPUTING SYSTEM, MANAGEMENT COMPUTING PROGRAM, AND MANAGEMENT COMPUTING METHOD

(71) Applicant: Hitachi, Ltd., Tokyo (JP)

(72) Inventors: Takuma Ojiro, Tokyo (JP); Nobuaki Ozaki, Tokyo (JP); Shinichi Hayashi, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 418 days.

(21) Appl. No.: 18/237,627

(22) Filed: Aug. 24, 2023

(65) Prior Publication Data

US 2024/0272960 A1 Aug. 15, 2024

(30) Foreign Application Priority Data

Feb. 9, 2023 (JP) ................................. 2023-018474

(51) Int. Cl.
*G06F 9/44* (2018.01)
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/4557* (2013.01)

(58) Field of Classification Search
CPC ......... G06F 9/45558; G06F 2009/4557; G06F 9/5077
USPC .......................................................... 718/1
See application file for complete search history.

(56) References Cited

U.S. PATENT DOCUMENTS

| | | | | | |
|---|---|---|---|---|---|
| 7,650,331 | B1 * | 1/2010 | Dean | ...................... | G06F 9/544 |
| | | | | | 712/203 |
| 8,812,811 | B1 * | 8/2014 | Chatterjee | ............. | G06F 3/0649 |
| | | | | | 711/170 |
| 2015/0254105 | A1 | 9/2015 | Nishimura | | |
| 2017/0228255 | A1 * | 8/2017 | Duan | ................ | G06F 16/24554 |
| 2017/0277563 | A1 | 9/2017 | Yoshikawa et al. | | |
| 2019/0227842 | A1 * | 7/2019 | Qiu | ....................... | G06F 9/5061 |

FOREIGN PATENT DOCUMENTS

| | | |
|---|---|---|
| JP | 2005148901 A | 6/2005 |
| JP | 2010113384 A | 5/2010 |
| JP | 2017174235 A | 9/2017 |
| JP | 2019-008444 A | 1/2019 |
| WO | 2014068950 A1 | 9/2016 |

OTHER PUBLICATIONS

Notice of Reasons for Refusal received in JP2023-018474, dated Nov. 18, 2025, in 6 pages (with translation).

* cited by examiner

*Primary Examiner* — Timothy A Mudrick
(74) *Attorney, Agent, or Firm* — Procopio, Cory, Hargreaves & Savitch LLP

(57) ABSTRACT

Table parallelization processing for parallelizing data processing is performed on a plurality of tables in units of allocation tables to a core of a processing execution computer, and record parallelization processing for dividing a table having a large data size into a plurality of records and parallelizing data processing on a plurality of records in units of allocation records to the core of the processing execution computer is performed when the table is larger than a predetermined data size.

20 Claims, 15 Drawing Sheets

FIG. 4

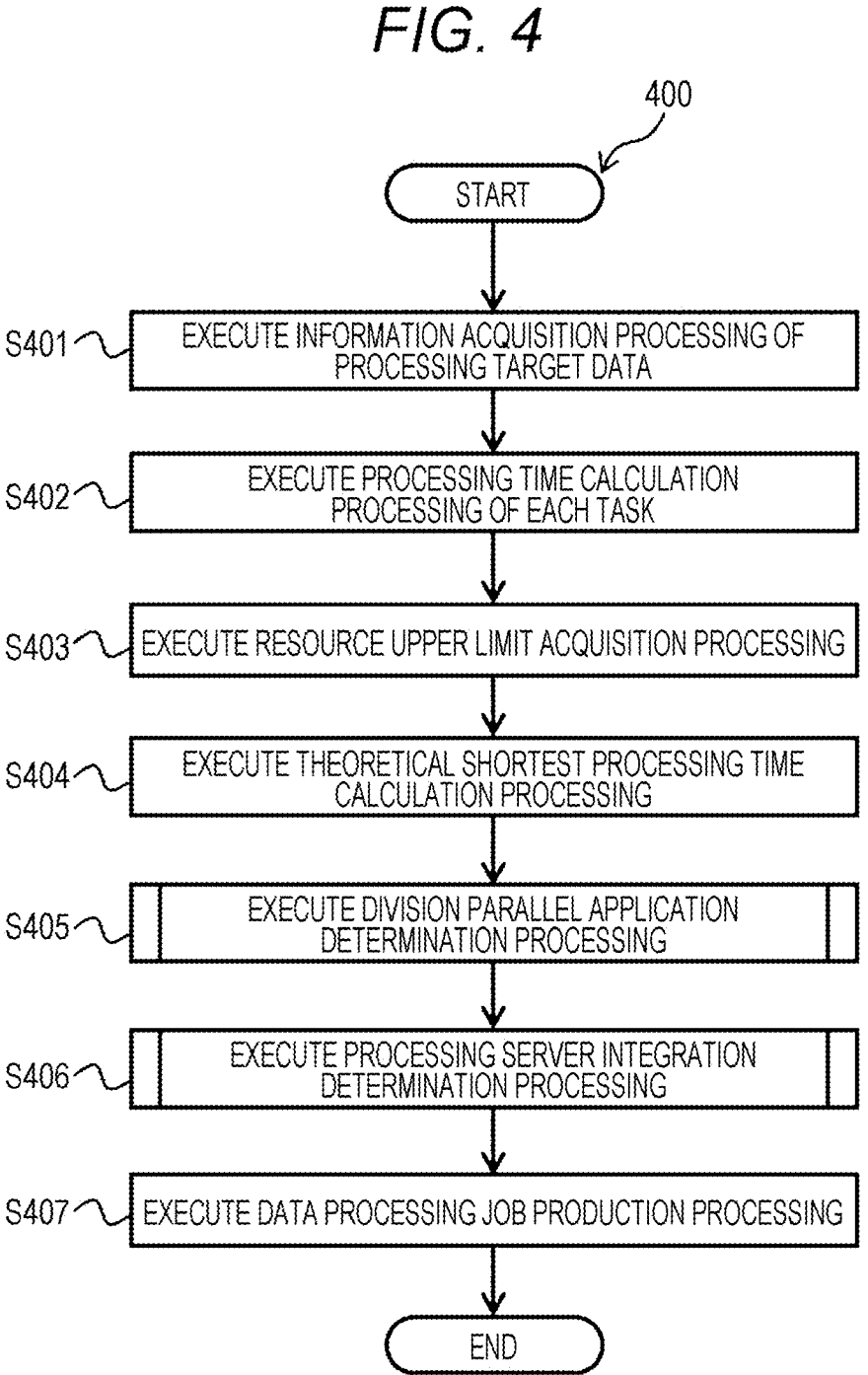

400

START

S401 — EXECUTE INFORMATION ACQUISITION PROCESSING OF PROCESSING TARGET DATA

S402 — EXECUTE PROCESSING TIME CALCULATION PROCESSING OF EACH TASK

S403 — EXECUTE RESOURCE UPPER LIMIT ACQUISITION PROCESSING

S404 — EXECUTE THEORETICAL SHORTEST PROCESSING TIME CALCULATION PROCESSING

S405 — EXECUTE DIVISION PARALLEL APPLICATION DETERMINATION PROCESSING

S406 — EXECUTE PROCESSING SERVER INTEGRATION DETERMINATION PROCESSING

S407 — EXECUTE DATA PROCESSING JOB PRODUCTION PROCESSING

END

| 501 | 502 | 503 | 504 | 505 | 506 |
|---|---|---|---|---|---|
| PROCESSING CLASSIFICATION | TOOL NAME | TIME COEFFICIENT | BAND COEFFICIENT | SUPPORT SIZE | OVERHEAD FORMULA |
| FILE TRANSFER | A COMPANY, A SOFTWARE | 1 | 70 | 2, 4, 8, 16, 32, 64, 128 | MIGRATION TIME BEFORE PARALLELIZATION×OVERHEAD COEFFICIENT $\alpha$ (0.1) |
| DATABASE | A COMPANY, B SOFTWARE | 1.25 | 10 | 2, 4, 8, 12, 16, 24, 32, 40, 48, 56, 64 | MIGRATION TIME BEFORE PARALLELIZATION×OVERHEAD COEFFICIENT $\beta$×PARALLELISM COEFFICIENT $\gamma$ |
| ⋮ | ⋮ | ⋮ | | ⋮ | ⋮ |
| BATCH | B COMPANY, C SOFTWARE | 0.95 | 90 | 2, 4, 8, 16, 32, 64 | MIGRATION TIME BEFORE PARALLELIZATION×OVERHEAD COEFFICIENT $\Omega$ |
| ⋮ | ⋮ | ⋮ | ⋮ | ⋮ | ⋮ |

Figure 7:
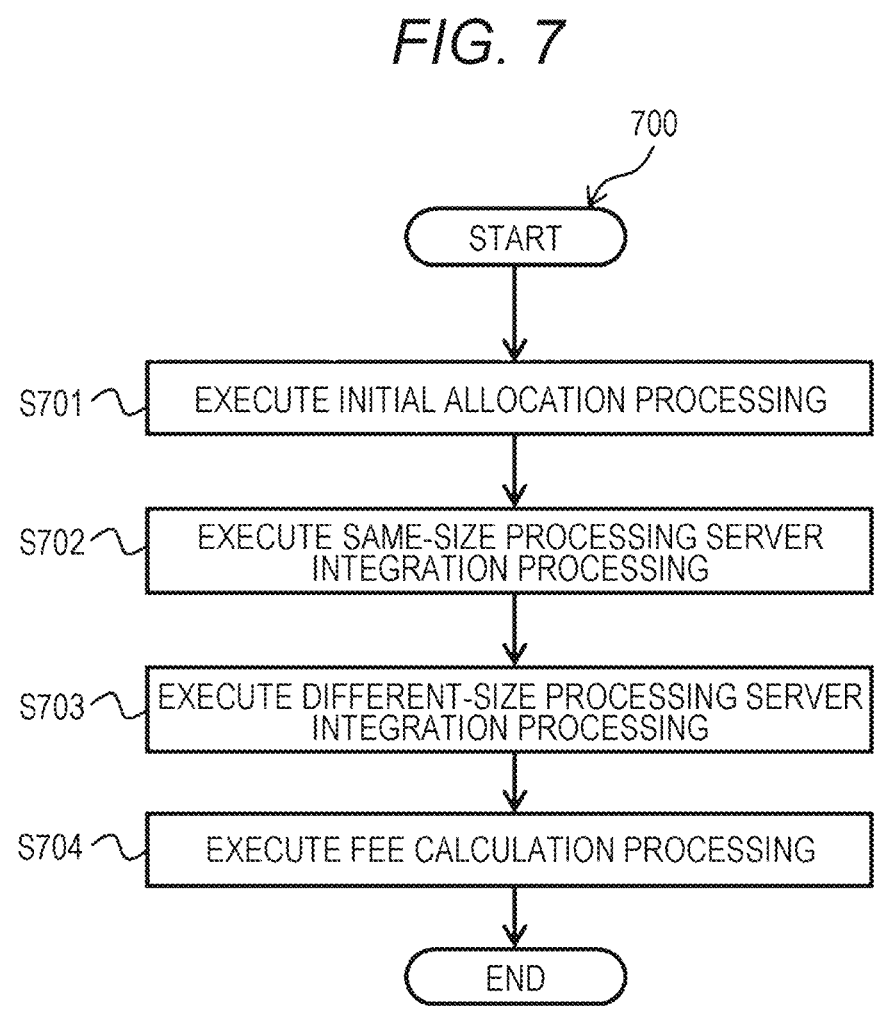

START

S701 — EXECUTE INITIAL ALLOCATION PROCESSING

S702 — EXECUTE SAME-SIZE PROCESSING SERVER
INTEGRATION PROCESSING

S703 — EXECUTE DIFFERENT-SIZE PROCESSING SERVER
INTEGRATION PROCESSING

S704 — EXECUTE FEE CALCULATION PROCESSING

END

*FIG. 15*

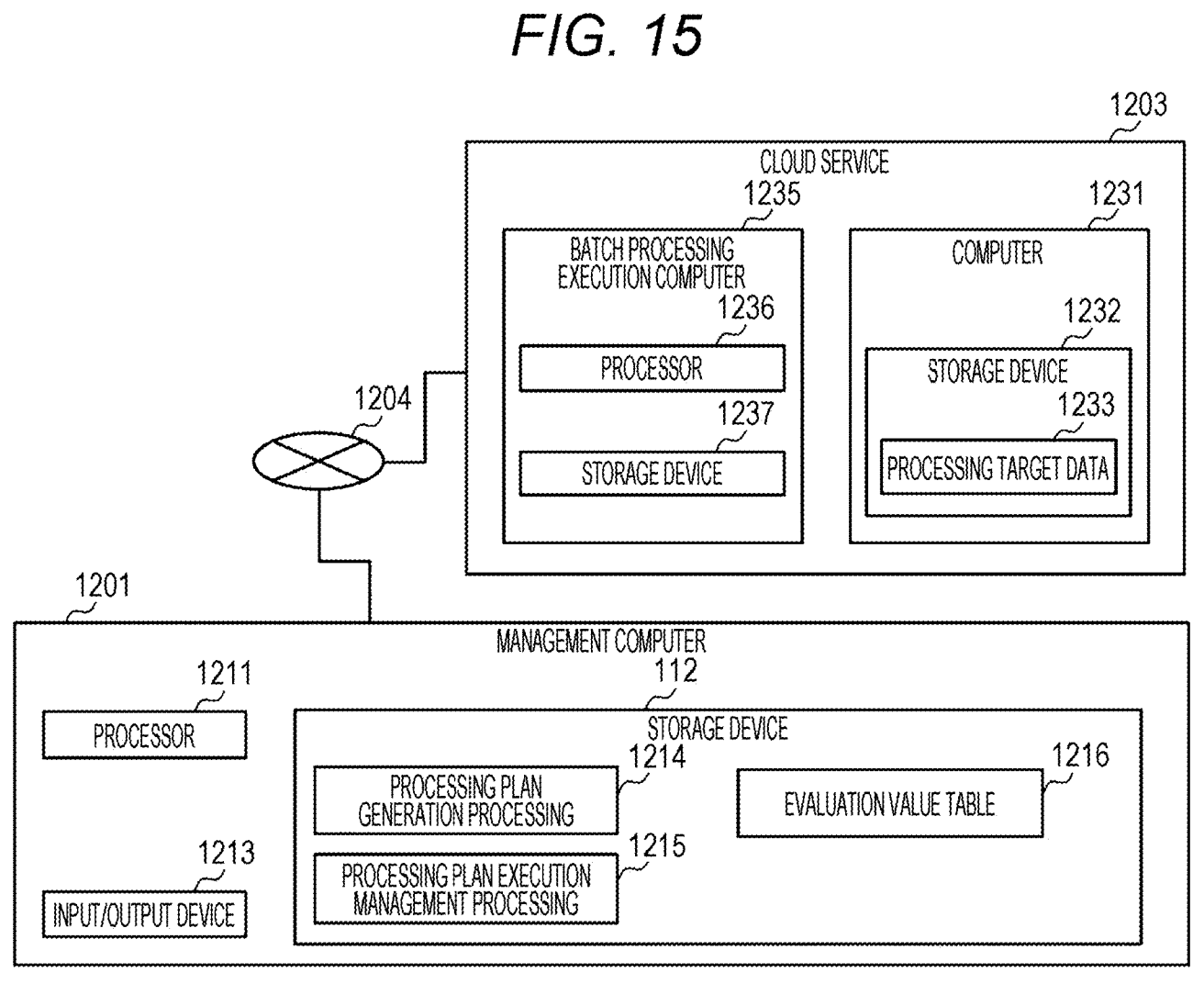

1203   CLOUD SERVICE

1231   COMPUTER

1232   STORAGE DEVICE

1233   PROCESSING TARGET DATA

1235   BATCH PROCESSING EXECUTION COMPUTER

1236   PROCESSOR

1237   STORAGE DEVICE

1204

1201   MANAGEMENT COMPUTER 112

STORAGE DEVICE

1216   EVALUATION VALUE TABLE

1214   PROCESSING PLAN GENERATION PROCESSING

1215   PROCESSING PLAN EXECUTION MANAGEMENT PROCESSING

1211   PROCESSOR

1213   INPUT/OUTPUT DEVICE

MANAGEMENT COMPUTER, MANAGEMENT COMPUTING SYSTEM, MANAGEMENT COMPUTING PROGRAM, AND MANAGEMENT COMPUTING METHOD

BACKGROUND OF THE INVENTION

1. Field of the Invention

The present invention relates to a management computer, a management computing system, a management computing program, and a management computing method.

2. Description of the Related Art

Conventionally, an application system has been operated by purchasing devices such as a dedicated server, a storage, and a network called an on-premises device. However, in recent years, a cloud-type system that makes an IT resource such as servers, storages, and networks available on demand has appeared, and it has become possible to procure the IT resource quickly and flexibly. Thus, for example, nonstationary processing such as batch processing, data backup, or analysis processing is increasingly performed using a cloud resource that is on-demand and volume-charged according to utilization.

In the information processing on the on-demand cloud resource, a job that handles a plurality of tasks having no dependency on the execution order is sometimes executed. In many cases, each of these tasks is processed in parallel in random order for each virtual core of the virtual server that is the cloud resource.

For example, JP 2019-008444 A discloses a technique for scheduling a plurality of types of tasks having different processing times. JP 2019-008444 A describes a technique for determining a device or cloud service to be used such as a server or a storage and estimating performance or availability according to business requirements.

SUMMARY OF THE INVENTION

A processing unit obtained by dividing the task can be efficiently processed using JP 2019-008444 A. However, in the technique of JP 2019-008444 A, a processing time by parallelizing the processing in consideration of an overhead of an increase in the processing time caused by the division of the task and a range of a load on a system cannot be shortened, but a skilled person is required to determine parallelization.

An object of the present invention is to perform appropriate processing parallelization when nonstationary processing is performed in a management computer by utilizing the on-demand volume-charged cloud resource.

A management computer according to an aspect of the present invention that executes data processing of processing target data having a plurality of tables using a processing execution computer on a cloud service, the management computer includes: a processor; an input/output device; a processing plan generation processing unit configured to cause the processor to generate a processing plan that is executed by utilizing an on-demand volume-charged cloud resource using data information input through the input/output device, and cause the input/output device to display the generated processing plan; and a processing plan execution management processing unit configured to cause the processor to perform execution management of the processing execution computer such that the data processing is executed according to the processing plan selected through the input/output device, in which the processing plan generation processing unit performs table parallelization processing for allocating a plurality of the tables to a core of the processing execution computer, parallelizing the data processing in units of the tables, processing a task in units of the tables, and executing the task by each of the core of the processing execution computer, and when the table is larger than a predetermined data size, performs record parallelization processing for dividing the table having the large data size into a plurality of records, allocating the plurality of records to the core of the processing execution computer, parallelizing the data processing in units of the records, processing the task in units of the records, and executing the task by the core of the processing execution computer.

According to one aspect of the present invention, in the management computer, the appropriate processing parallelization can be performed when the nonstationary processing is processed using the on-demand volume-charged cloud resource.

BRIEF DESCRIPTION OF THE DRAWINGS

FIG. 4 is a flowchart illustrating a procedure example of processing plan generation processing;

FIG. 5 is a view illustrating an example of evaluation value table information;

FIG. 7 is a flowchart illustrating a procedure example of processing server allocation processing;

FIG. 15 is a block diagram illustrating a configuration example of a computer system according to a second embodiment of the present invention.

DESCRIPTION OF THE PREFERRED EMBODIMENTS

Figure 1:
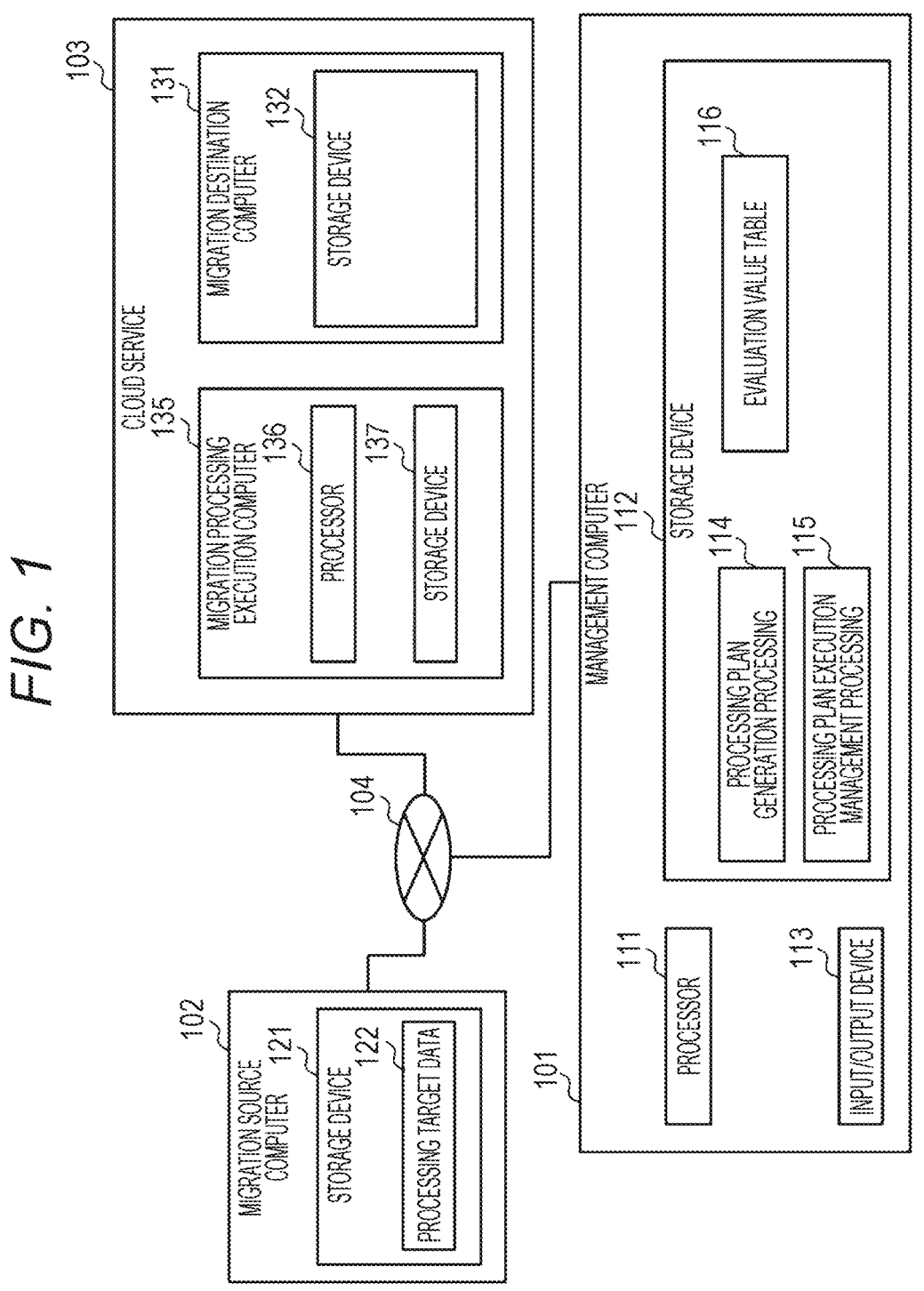
FIG. 1 is a block diagram illustrating a configuration example of a computer system according to a first embodiment of the present invention.

In the following description, a "memory" is at least one memory device, and may typically be a main storage device. The at least one memory device in the memory may be a volatile memory device or a nonvolatile memory device.

In the following description, a "persistent storage device" is at least one persistent storage device. The persistent storage device is typically a nonvolatile storage device (for example, an auxiliary storage device), and for example, is specifically a hard disk drive (HDD) or a solid state drive (SSD).

In the following description, the "storage device" may be either the "memory" or the "permanent storage device".

In the following description, a "processor" is at least one processor device. The at least one processor device is typically a microprocessor device such as a central processing unit (CPU), and may be another type of processor device such as a graphics processing unit (GPU). In addition, the at least one processor device may be a single core or a multi-core. Also, the at least one processor device may be a processor core. Furthermore, the at least one processor device may be a processor device in a broad sense such as a hardware circuit (for example, a field-programmable gate array (FPGA) or an application specific integrated circuit (ASIC)) that performs some or all of processing.

In addition, in the following description, information from which output is obtained with respect to input will be described in an expression such as "xxx table". However, the information may be data having any structure, or may be a learning model such as a neural network that generates the output with respect to the input. Accordingly, the "xxx table" can be rephrased as "xxx information". Furthermore, in the following description, a configuration of each table is an example, one table may be divided into at least two tables, and all or a part of at least two tables may be one table, or may include some data fields (not illustrated).

Furthermore, in the following description, sometimes processing is described with a "program" as a subject, but the subject of the processing may be a processor (alternatively, a device such as a controller having the processor) because the program is executed by the processor to perform defined processing appropriately using a storage device and/or an interface device. The program may be installed in a device such as a computer from a program source. For example, the program source may be a program distribution server or a computer-readable (for example, non-transitory) recording medium. In the following description, at least two programs may be implemented as one program, or one program may be implemented as at least two programs.

In addition, in the following description, a function may be described using an expression such as "xxx unit", but the function may be implemented when a processor executes at least one computer program, or may be implemented by at least one hardware circuit (for example, FPGA or ASIC). In the case where the function is implemented when the processor executes the program, because the determined processing is appropriately performed using the storage device and/or the interface device, the function may be at least a part of the processor. Furthermore, the processing described with the function as the subject may be processing performed by the processor or a device including the processor. In addition, the program may be installed from a program source. For example, the program source may be a program distribution computer or a computer-readable recording medium (for example, a non-transitory recording medium). The description of each function is an example, and a plurality of functions may be integrated into one function or one function may be divided into a plurality of functions.

In the following description, a "computer system" is a system including at least one physical computer. The physical computer may be a general-purpose computer or a dedicated computer.

A control line and an information line indicate those which are considered necessary for the description, but do not necessarily indicate all the control lines and information lines necessary for the mounting. Actually, it can be considered that almost all the components are connected to each other.

Hereinafter, a set of at least one computer that manages an information processing system and displays display information of the embodiment may be referred to as a management system. When a computer for management (hereinafter, a management computer) displays the display information, the management computer is the management system, and a combination of the management computer and the display computer is also the management system. In addition, processing equivalent to the management computer may be implemented by a plurality of computers in order to increase speed and reliability of the management processing, and in this case, the plurality of computers (including the display computer when the display computer performs display) is the management system.

The present invention is not limited to the above-described embodiment, but includes various modifications and equivalent configurations within the spirit of the appended claims. For example, the above embodiment has been described in detail for easy understanding of the present invention, and the present invention is not necessarily limited to the embodiment having all the configurations described above. A part of the configuration of one embodiment may be replaced with the configuration of another embodiment. The configuration of another embodiment may be added to the configuration of a certain embodiment. In a part of the configuration of each embodiment, another configuration may be added, deleted, or replaced.

A first embodiment of the present invention will be described below with reference to the drawings.

First Embodiment

FIG. 1 is a block diagram illustrating a configuration example of a computer system according to a first embodiment of the present invention.

The computer system of the first embodiment exemplifies a case where a processor 111 of a management computer 101 performs task scheduling of migrating migration target data 122 stored in a storage device 121 included in a migration source computer 102 to a storage device 132 included in a migration destination computer 131 by a migration processing execution computer 135 that is an on-demand volume-charged cloud resource on cloud service 103 as nonstationary processing using the on-demand volume-charged cloud resource.

The computer system of the first embodiment is a system in which the management computer 101, the migration source computer 102 of the data transfer processing, the migration destination computer 131 on the cloud service 103, and the migration processing execution computer 135 on the cloud service 103 can be mutually connected through a network 104.

The management computer 101 includes a processor 111, a storage device 112, and an input/output device 113. The input/output device 113 is not necessarily provided in the management computer 101, but may be connected through the network 104. At this point, for example, the input/output device 113 is a touch panel, a tablet terminal, a display, a keyboard, or a mouse.

The processor 111 implements processing plan generation processing 114 and processing plan execution management processing 115 by developing and executing the program in the storage device 112. Here, the processing plan generation processing 114 is referred to as a "processing plan generation processing unit", and the processing plan execution management processing 115 is referred to as a "processing plan execution management processing unit".

In addition, the storage device 112 stores an evaluation value table 116 in addition to the data corresponding to the processing plan generation processing 114 and the processing plan execution management processing 115. The processing and the information stored in the storage device 112 may be stored in different storage devices, or stored in a storage device (not illustrated) connected through the network 104.

The processing plan generation processing 114 is processing for calculating a processing plan of the data transfer processing that is executed using the on-demand volume-charged cloud resources based on migration source data connection information and migration destination data connection information that are input through the input/output device 113, and displaying a calculation result through the input/output device 113.

The processing plan execution management processing 115 is processing for performing an execution operation of the migration processing execution computer 135 through the network 104 such that the data transfer processing is executed according to the processing plan selected through the input/output device 113.

The network 104 is a communication path connected in a wired or wireless manner. Examples of the network 104 include a wired LAN cable and wireless Wi-Fi (registered trademark), but are not limited thereto.

The cloud service 103 includes a network device, a server device, and a storage device, and provides a wide variety of IT service meeting specified requirements such as a virtual server and a database service. For example, a computer system provided by a company that provides a cloud service as a business may be used, or a computer system independently held by an individual or a company may be used.

Figure 2:
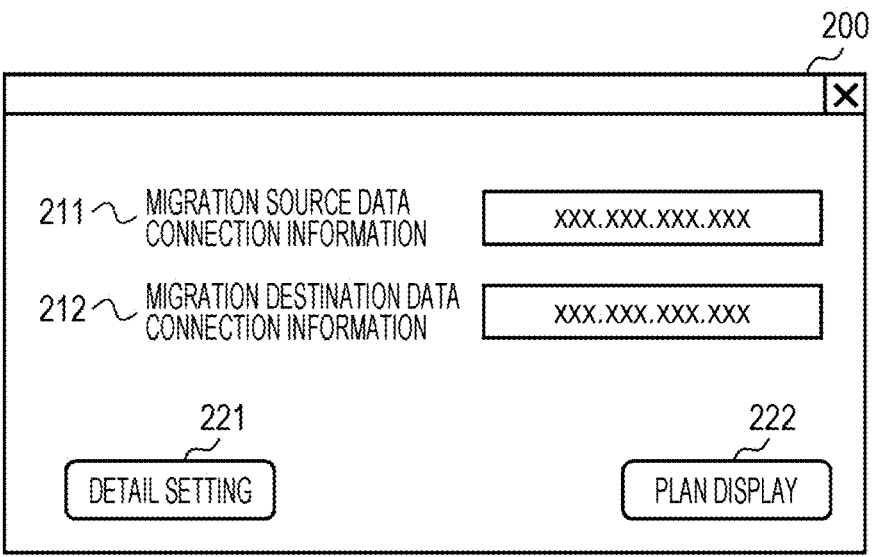
FIG. 2 is a view illustrating an example of an input screen.

FIG. 2 illustrates an example of a condition input screen in which the migration source data connection information and the migration destination data connection information that are input to the processing plan generation processing 114 are set in the first embodiment of the present invention.

A condition input screen 200 includes a migration source data connection information field 211 that receives input of the migration source data connection information, a migration destination data connection information field 212 that receives the migration destination data connection information, a detailed setting button 221 that calls a detailed setting screen (not illustrated), and a plan display button 222 that gives an instruction to start the execution of the processing plan generation processing.

At this point, for example, the detailed setting screen (not illustrated) is a screen inputting other pieces of detailed information, such as a user name and a password for login, that cannot be input by the migration source data connection information 211 and the migration destination data connection information 212 and a processing plan generation constraint condition such as a target processing time for which processing is desired to be completed and an upper limit of available cloud resources. When the detailed setting screen (not illustrated) is previously displayed in the condition input screen 200, the condition input screen 200 may not include the detailed setting button 221.

Figure 3:
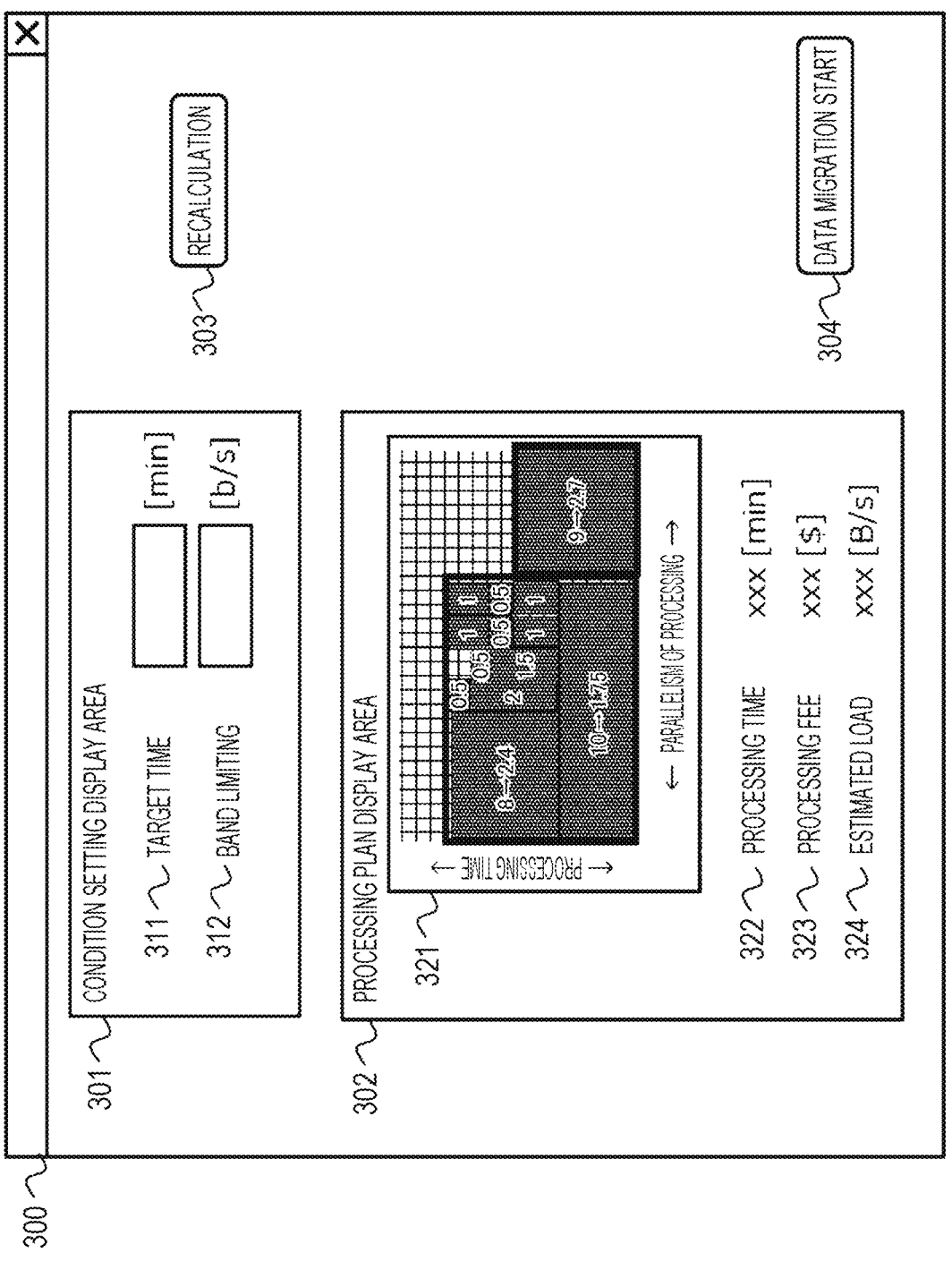
FIG. 3 is a view illustrating an example of a processing plan display screen.

FIG. 3 illustrate an example of a processing plan display screen output by the processing plan generation processing 114 in the first embodiment of the present invention.

A processing plan display screen 300 includes a condition setting display area 301 that inputs a processing plan condition, a processing plan display area 302 that displays processing plan information, a recalculation button 303 that executes processing for generating the processing plan again under the conditions input in the condition setting display area 301, and a data migration start button 304 that instructs the start of the execution of the data migration processing based on the calculated processing plan. The condition setting display area 301 includes a target time field 311 to which a target time that completes processing is input, and a band limit field 312 to which a limit of cloud resources available for the processing is input.

The condition setting display area 301 may include a field (not illustrated) to which a processing plan generation condition is input in addition to the target time field 311 and the band limit field 312. When the processing for inputting the processing conditions from the user and regenerating the processing plan is not executed, the processing plan display screen 300 may not include the condition setting display area 301 and the recalculation button 303.

The processing plan display area 302 includes a graph area 321 in which a processing schedule is graphically displayed on an axis of a processing time and a parallelism degree of processing, a processing time field 322 in which an estimated processing time is displayed, a processing fee field 323 in which an on-demand additional resource fee required for the data migration processing, and an estimated load field 324 in which an estimated load applied to the system by the data migration processing is displayed.

The processing plan display screen 300 does not necessarily include the graph area 321, but may include an information field (not illustrated) in which information about other processing plans is displayed. For example, the processing plan display screen 300 may not include the data migration start button 304 when execution authority of the data migration processing is previously given and the data migration execution instruction from the user is not required to be input. FIG. 4 is a flowchart illustrating a procedure example of the processing plan generation processing 114 of the management computer 101.

The processing plan generation processing 114 illustrated in the flowchart is executed by an instruction from the plan display button 222 displayed on the condition input screen 200 or an instruction from the data migration start button 304 displayed on the processing plan display screen 300. Alternatively, the processing may be executed by an instruction of some program.

In FIG. 4, the management computer 101 executes processing target data information acquisition processing (S401), processing time calculation processing of each task (S402), resource upper limit acquisition processing (S403), theoretical shortest processing time calculation processing (S404), division parallel application determination processing (S405), processing server integration determination processing (S406), and data processing job production processing (S407). A processing plan generation processing flow 400 may include another processing step (not illustrated). In addition, execution order of some pieces of processing may be changed or parallel execution may be performed within a range in which inconsistency is not generated in input/ output. When the processing plan generation processing flow 400 is executed a plurality of times, values in executing some processing steps in the past may be previously held, and the same value may be output without being executed again.

In the processing target data information acquisition processing (S401) of the processing plan generation processing flow 400, for example, the management computer 101 acquires the data amount of each table stored in the database as information about the migration target data 122 stored in the storage device 121 on the migration source computer 102 based on the information input on the condition input screen 200.

In the processing time calculation processing (S402) of each task of the processing plan generation processing flow 400, the management computer 101 calculates the processing time of each migration target table using the information about the migration target data 122 acquired in the processing target data information acquisition processing (S401) and the information about the evaluation value table 116.

For example, when 10 tables exist as the migration target data, how many hours a migration time of each table is calculated such that the processing time of a certain table is 20 hours and the processing time of another table is 1 hour.

In the resource upper limit acquisition processing (S403) of each task of the processing plan generation processing flow 400, pieces of specification information about the migration source computer 102, the migration destination computer 131, and the network 104 are acquired as the information about the execution environment of the processing, a place that becomes the bottleneck of the processing is specified, and the parallelism degree of the available processing is computed using the specification value of the place and information about an evaluation value table 500.

In the resource upper limit acquisition processing (S403), the detailed setting screen (not illustrated) in the condition input screen 200 or the numerical value of the upper limit specified in the band limit field 312 on the processing plan display screen 300 is compared with the bottleneck portion, and the upper limit of the parallelism of the processing obtained from the smaller value is preferentially output. For example, when the value specified in the band limit field 312 is less than the data transfer band available in the network 104 having the lowest specification among the values acquired as the information about the execution environment of the processing, the parallelism degree of the processing obtained from the value specified in the band limit field 312 is output.

The parallelism degree of the processing output by the resource upper limit acquisition processing (S403) is a value indicated in a support size field 505 of the evaluation value table 500 in consideration of the number of cores of an instance available as the migration processing execution computer 135.

For example, when the minimum value of the support size field 505 is 2 and the parallelism degree of the processing calculated in the resource upper limit acquisition processing (S403) is 11, 11 cannot be implemented regardless of the combination of the instances. In this case, the resource upper limit acquisition processing (S403) outputs 11 that is less than or equal to the upper limit of the processing parallelism degree and 10 that is the maximum value of the number of cores that can be implemented by the combination of the instances.

In the theoretical shortest processing time calculation processing (S404) of each task of the processing plan generation processing flow 400, when the overhead does not exist in parallel processing of the task, the processing time required in the case where the processing target data is maximally parallelized is calculated within the range of the upper limit of the parallelism degree of the processing obtained in the resource upper limit acquisition processing (S403).

For example, when the total of the migration times of the tables that becomes the migration target calculated in the processing time calculation processing (S402) of each task is 100 hours, and when the parallelism degree of the processing calculated in the resource upper limit acquisition processing (S403) is 10, the theoretical shortest processing time is obtained as 10 hours from a formula of 100÷10=10.

Figure 11:
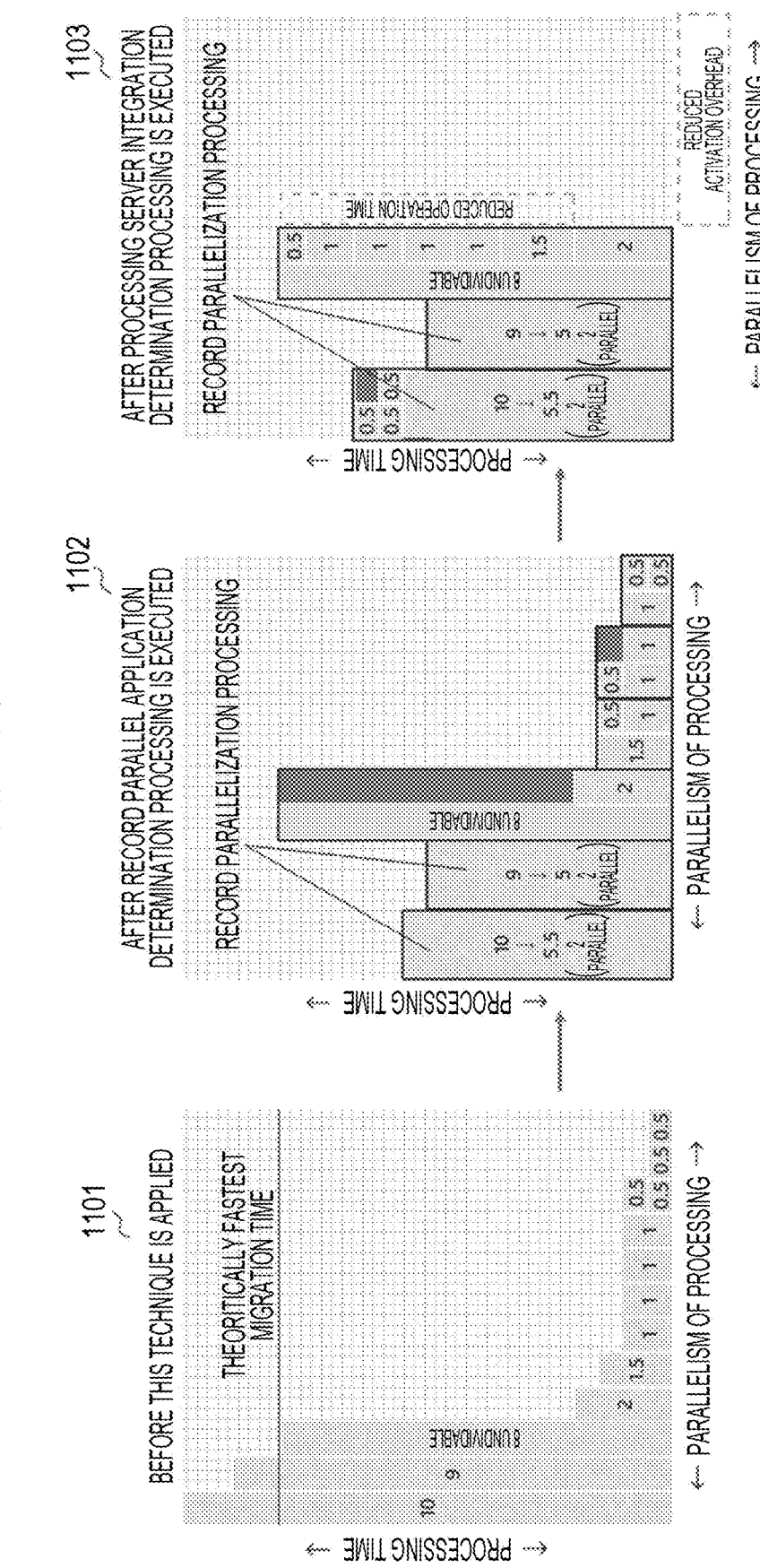
FIG. 11 is a conceptual diagram illustrating a second application example of the processing plan generation processing.

However, as illustrated in 1101 of FIG. 11, sometimes a huge table to which the record parallelization cannot be applied exists in the table. When the table in which the processing time is greater than the theoretical shortest processing time calculated by the shortest processing time calculation processing (S404), the processing time of the greatest table to which the record parallelization cannot be applied is defined as the theoretically fastest migration time.

The record parallelization will be described later. In the theoretical shortest processing time calculation processing (S404), for example, when the target time of the data processing time is input from the target time field 311 of the plan display screen 300 displayed on the input/output device 113, and when the target time of the data processing time is greater than the theoretical shortest processing time calculated by the above-described process, the above-described target time of the data processing time may be used instead of the value of the theoretical shortest processing time.

In the division parallel application determination processing (S405) of each task of the processing plan generation processing flow 400, a task schedule in which two parallelization techniques are combined in order to shorten the processing time is calculated. Details of the division parallel application determination processing (S405) will be described with reference to FIG. 6.

In the processing server integration determination processing (S406) of each task of the processing plan generation processing flow 400, the task schedule shortening the total operation time of the migration processing execution computer 135 used in the data transfer processing is calculated. Details of the processing server integration determination processing (S406) will be described with reference to FIG. 9.

In the data processing job production processing (S407) of the processing plan generation processing flow 400, an operation setting operating the migration processing execution computer 135 according to the task schedule calculated in the processing server integration determination processing (S406) is calculated. The operation setting may be a setting file or a command for operating API.

FIG. 5 is an explanatory diagram illustrating information held in the evaluation value table 116.

The evaluation value table 500 includes a processing classification field 501, a tool name field 502, a time coefficient field 503, a band coefficient field 504, a support size field 505, and an overhead formula field 506. Some of the data fields included in the evaluation value table 500 may not exist, or some data fields (not illustrated) may be included separately.

The processing classification field 501 and the tool name field 502 are identifier information for first determining in which column the data stored is to be acquired when the information about the evaluation value table 500 is acquired in the processing plan generation processing flow 400. In the first embodiment, for example, the processing classification field 501 and the tool name field 502 may be designated by a setting file (not illustrated) or designated by a setting screen (not illustrated).

The time coefficient field 503 is a coefficient calculating the processing time of each task in the processing plan generation processing flow 400. For example, in the processing time calculation processing (S402), the management server 101 calculates the processing time of the migration target data table by multiplying the data amount of the data table that is the migration target acquired in the processing target data information acquisition processing (S401) by the value of the time coefficient field 503 of the evaluation value table 500.

The band coefficient field 504 is a coefficient used to calculate the parallelism degree of the processing of the migration processing execution computer 135 in the processing plan generation processing flow 400. For example, in the resource upper limit acquisition processing (S403), the management server 101 calculates the parallelism degree of the processing by rounding down decimal places obtained by dividing band performance information about the storage device 132 acquired in the resource upper limit acquisition processing (S403) by the value of the band coefficient field 504 of the evaluation value table 500.

In the processing plan generation processing flow 400, the support size field 505 is a numerical value that is a candidate for the parallelism degree of the division and parallel to be applied to a large task that is the bottleneck of the migration time shortening. These numerical values are derived from the number of cores of the instances supported by the cloud resource available as the migration processing execution computer 135 in order to be used as a constraint condition applying the division parallel without generating a standby time of the core of the migration processing computer 135 that executes the division parallel.

The overhead formula field 506 is a formula calculating the overhead of an increase in processing time that is generated when the parallelization of the processing is applied in the processing plan generation processing flow 400. In the first embodiment, in the case of table parallelization in which the migration processing of the data table that is the migration target is allocated to each core of the processor 136 of the migration processing execution computer 135 and parallelized, the overhead of the processing time increase due to the parallelization is not generated, but in the case of record parallelization in which the data table that is the migration target is divided into a plurality of pieces in units of records and parallelized, the overhead of the processing time increase due to the parallelization is generated.

For example, in the case where the table in which migration processing time before the record parallelization takes 10 hours exists, in the case where the table is divided into four and the record parallelization is applied, when the overhead does not exist, because $10÷4=2.5$ is satisfied, the migration is completed by processing each of the four cores for 2.5 hours. However, because excessive processing dividing and transferring the table is actually generated, it takes 3.5 hours.

In this example, 3.5 hours−2.5 hours=1.0 hours is the overhead. The overhead formula field 506 stores a formula calculating the overhead time. For example, when the migration time before parallelization×overhead coefficient α (0.1) is recorded in the formula field 506, in the case where the record parallelization is applied to the table in which the migration time before the record parallelization is applied is 10 hours, it can be seen that the overhead of 1.0 hours is generated by calculation of $10×0.1=1.0$ regardless of the parallelism degree of the record parallelization.

Because the processing time of the record parallelization can be calculated from the migration time before the parallelization÷the parallelism+the overhead, the migration time in the case where this table is parallelized 2 times by the record parallelization becomes $10÷2+1.0=6.0$ hours, and the migration time in the case where this table is parallelized 10 times by the record parallelization is obtained as $10÷10+1.0=2.0$.

Figure 6:
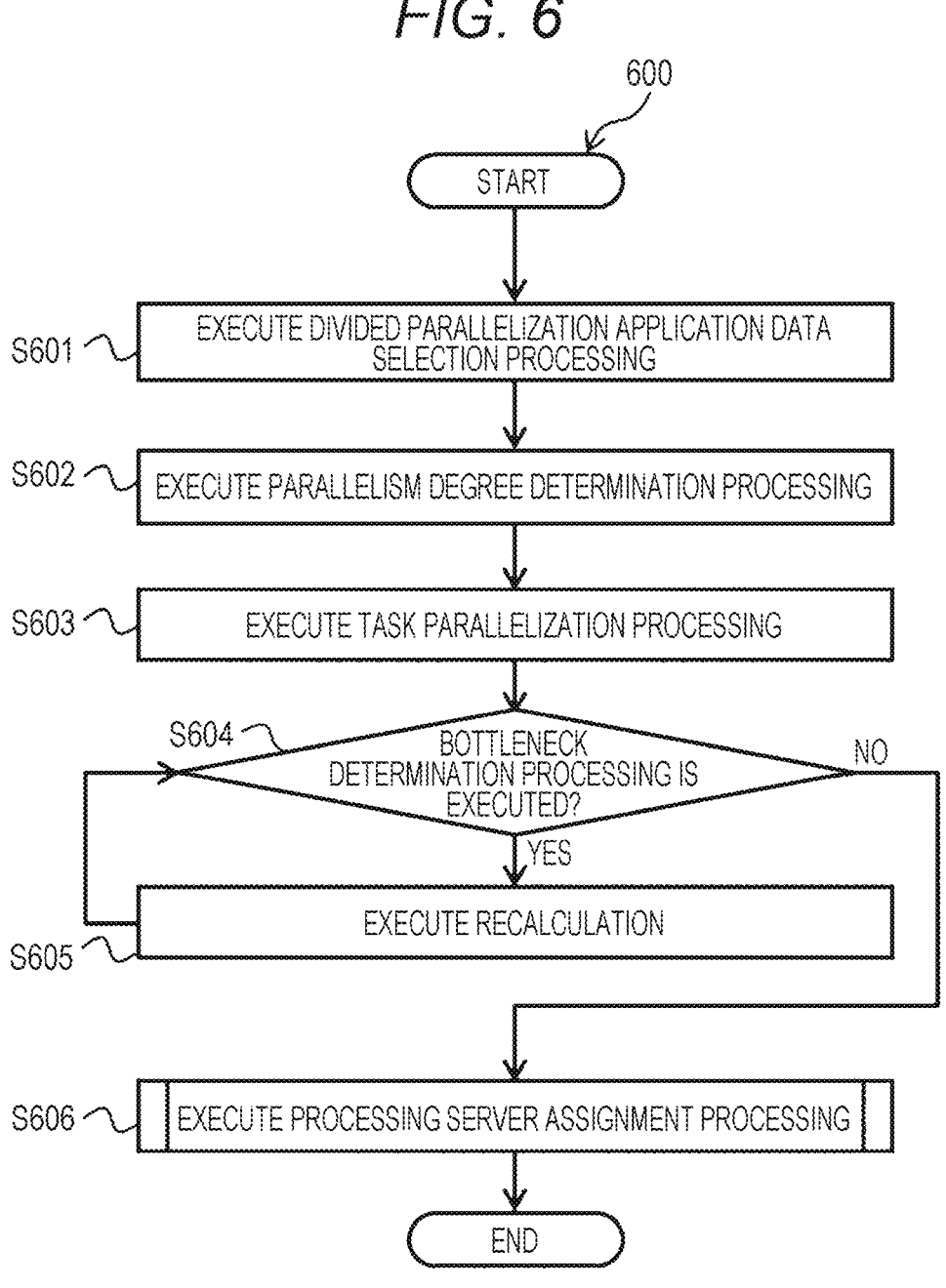
FIG. 6 is a flowchart illustrating a procedure example of division parallelization application determination processing.

FIG. 6 is a flowchart illustrating a detailed procedure example of the division parallel application determination processing (S405) of each task of the processing plan generation processing flow 400.

In FIG. 6, the management computer 101 executes division parallelization application data selection processing (S601), parallelism degree determination processing (S602), task parallelization processing (S603), bottleneck determination processing (S604), recalculation processing (S605), and processing server allocation processing (S606). The division parallelization application determination processing flow 600 may include processing steps (not illustrated) other than these, or some of them may not be executed.

The purpose of the division parallel application determination processing flow 600 is to calculate the task schedule in which division parallelization and task parallelization are appropriately combined in consideration of the constraint of the migration processing execution computer 135 in order to shorten the processing time of the data transfer processing.

In the case of data transfer of a database, the data transfer of a plurality of tables is usually performed, but data transfer processing is parallelized in units of tables. That is, the task processing is performed in units of tables, and the core of the processing server executes each task. Although this is task parallelization, this is referred to as table parallelization here.

In the case where the huge data table exists, the transfer processing time of the huge data table becomes the bottleneck no matter how the table is parallelized, and the time of the entire data transfer processing cannot be shortened. In this case, a record constituting the huge data table can be divided and parallel transfer processing can be performed. This is division parallelization, and this is referred to as record parallelization here.

Here, a relationship between the table parallelization and the record parallelization will be described with reference to FIGS. 14A and 14B.

(a) indicates the case where the table size is smaller than a predetermined value. In this case, cores are allocated in units of tables, and table parallelization processing is performed.

(b) indicates the case where the table size is larger than the predetermined value. In this case, the table is divided in units of records and allocated to the core in units of records, and the record parallelization processing is performed.

As described in the description of the overhead formula field 506 in FIG. 5, because the temporal overhead exists in the record parallelization, the processing time increases by the overhead, and accordingly, the operation time of the migration processing execution computer also increases, leading to an increase in cost. Therefore, the application of the inadvertent record parallelization is desirably avoided.

In the case of the table parallelization, there is no problem even when table parallelization is divided into a plurality of migration processing execution computers 135 and executed, but in the case of the record parallelization, the record parallelization is required for being executed on the single migration processing execution computer 135. In order not to generate the standby time of surplus cores when the migration processing execution computer 135 executes the record parallel transfer processing, the number of cores included in the instance available as the migration processing execution computer 135 is set as the processing parallelism degree of the record parallel transfer processing.

In the division parallelization application data selection processing (S601) of the division parallel application determination processing flow 600, the management computer 101 selects the table to which the record parallelization is applied from the table group that becomes the migration target.

Among the table groups that becomes the migration target, the table in which the time required for the transfer processing is longer than the theoretical shortest processing time calculated in the theoretical shortest processing time calculation processing (S404) of each task of the processing plan generation processing flow 400 is determined as the application target of the record parallelization.

Figure 10:
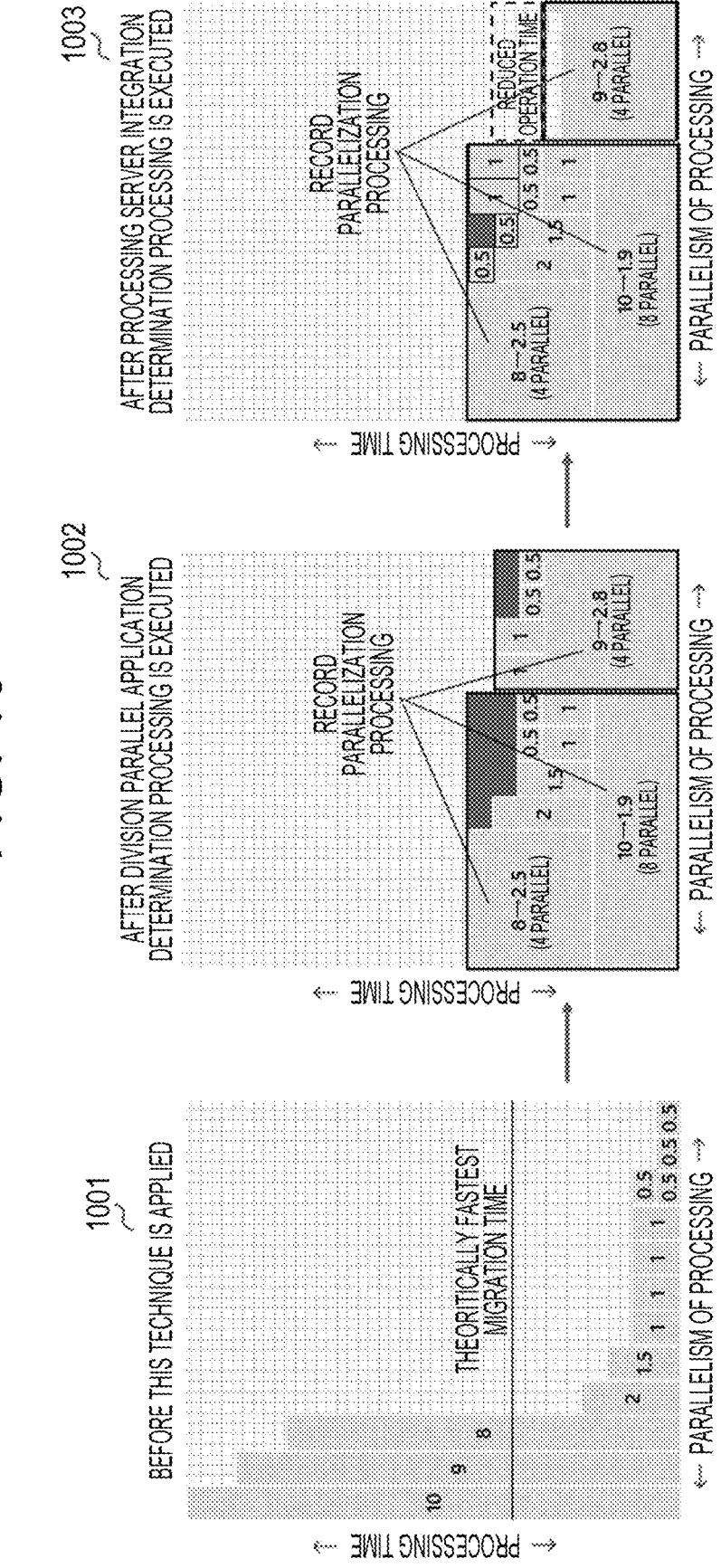
FIG. 10 is a conceptual diagram illustrating a first application example of processing plan generation processing.

For example, FIG. 10 illustrates the case where 13 tables are parallelized in the range of a parallelism degree 12. A vertical axis represents the processing time, and a horizontal axis represents the parallelism degree of the processing. Each box has a height linked with the processing time per task. Because the horizontal axis represents the parallelism degree of the processing, the horizontal axis may be regarded as processing allocated to the core. For example, the leftmost core processes 10 tables, the second core from the left processes 9 tables, and the third core from the right processes 0.5 tables first and then processes 0.5 tables.

1001 illustrates the state in which 12 tables are arranged in parallel in descending order of the processing time of the migration target table based on a greedy method. Because the processing is arranged based on the greedy method, the processing of the table arranged exceeding the upper limit of the parallel processing is arranged at the shortest processing time.

The total processing time of the tables in FIG. 1001 is 10+9+8+2+1.5+1+1+1+0.5+0.5+0.5+0.5=36.5, and the theoretical fastest migration time in the case of 12 parallel is 36.5÷12≈3.

In 1001 of FIG. 10, three tables having processing times of 10, 9, and 8 are selected as the target to which the record parallelization is applied. In the case illustrated in 1101 of FIG. 11, because the processing time of the table in which the processing time for which the record parallelization cannot be applied is 8 is the theoretically fastest migration time, the table in which the processing times are 10 and 9 is selected as the target to which the record parallelization is applied.

The parallelism degree determination processing (S602) of the division parallel application determination processing flow 600 is processing for determining the parallelism degree when the record parallelization is applied. The upper limit of the parallelism degree determined in the parallelism degree determination processing (S602) is a numerical value described in the support size field 505 of the evaluation value table 500 as a candidate with the value of the processing parallelism degree calculated in the resource upper limit acquisition processing (S403) as the upper limit.

For example, when the upper limit of the parallelism degree is 12 and when the value of the support size field 505 is 2, 4, 8, 16, 32, 64, 128, the parallelism degree is obtained with 2, 4, 8 as the candidate. The parallelism degree determined by the parallelism degree determination processing (S602) is the minimum parallelism degree in which the processing time when the record parallelization is applied is shorter than the theoretical shortest processing time calculated by the theoretical shortest processing time calculation processing (S404) of each task.

When the maximum parallelism degree as the candidate does not fall below the theoretical shortest processing time, the maximum parallelism degree may be treated as the determined numerical value. At this point, the processing time when the record parallelization is applied is a processing time in consideration of the overhead when the record parallelization is applied.

In the case illustrated in 1001 of FIG. 10, 8 parallel is determined for the table with the processing time of 10, and 4 parallel is determined for the tables with the processing times of 9 and 8 as the processing parallelism degree of the record parallelization. In the case illustrated in 1101 of FIG. 11, 2 parallel is determined as the processing parallelism of the record parallelization for both the table having the processing time of 10 and the table having the processing time of 9.

The task parallelization processing (S603) of the division parallel application determination processing flow 600 is processing for calculating the processing schedule in which both the table to which the record parallelization is applied and the table to which the record parallelization is not applied are processed in the table parallelization. Within the range of the upper limit of the processing parallelism, all the tables may be arranged in the priority order of the magnitude of the parallelism degree of the record parallelization>the length of the processing time, and then arranged by the greedy method.

The arrangement illustrated in 1002 of FIG. 10 is a view visualizing the task schedule after the division parallel determination processing (S405), and is used as a reference diagram of the arrangement by the task parallelization processing (S603). In 1002 of FIG. 10, parallel processing is performed by two migration processing execution computers 135 of eight cores and four cores. It is found that the 8-core migration processing execution computer 135 operates for 1.9+2.5=4.4 hours, the 4-core migration processing execution computer 135 is activated for 2.8+1=2.8 hours, and it takes 4.4 hours to complete the migration processing of all the 13 tables. Comparison between 1001 and 1002 in FIG. 10 shows that the processing time can be shortened from 10 hours to 4.4 hours.

1102 in FIG. 11 indicates that processing is performed by six processing servers of 2 cores, and it can be seen that the processing time is 8 that is the processing time of the table that cannot be divided.

The bottleneck determination processing (S604) of the division parallel application determination processing flow 600 is processing for selecting the task that is the bottleneck of the task schedule calculated by the task parallelization processing (S603). It can be determined that the table having the longest processing time among the tables scheduled to be processed by the core having the longest processing time is the bottleneck.

For example, in the case illustrated in 1002 of FIG. 10, the left four cores have the longest processing time, and the table serving as the bottleneck is the table in which the table originally having the processing time of 8 is processed in 4 parallel by record parallelization to be 2.5 hours.

In the recalculation processing (S605) of the division parallel application determination processing flow 600, the task schedule in the case where the one-stage record parallelization is applied to the table acquired in the bottleneck determination processing (S604) is computed, the migration processing time can be shortened, and whether a cost reduction effect due to the migration time shortening is obtained than the total amount of overhead by the record parallelization. It is determined that the record parallelization is applied to the table that is the bottleneck when both the migration processing time and the cost can be reduced, and it is determined that the schedule in which the record parallelization is not applied when there is no effect.

Figure 12:
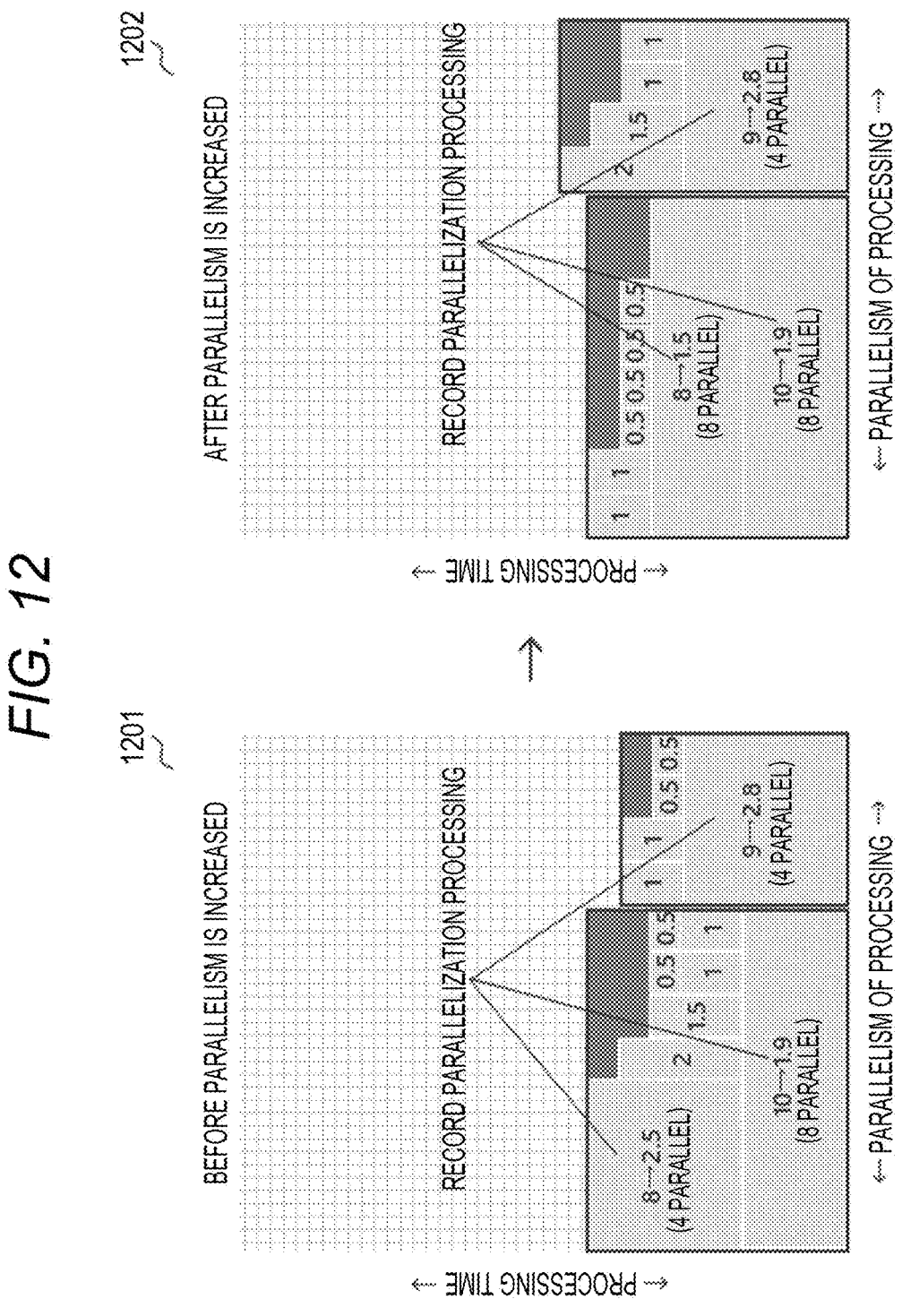
FIG. 12 is a conceptual diagram illustrating a determination example of bottleneck determination processing

In FIG. 12, in the schedule of 1201 (the same as 1002), a result calculating the schedule in the case where the parallel degree is increased by one step in the recalculation processing (S605) when it is determined in the bottleneck determination processing (S604) that the table originally having the processing time of 8 is the bottleneck is illustrated in 1202. In this case, the processing time cannot be shortened by increasing the parallelism degree of the record parallelization, and the cost reduction cannot be expected. For this reason, it is determined that the processing for increasing the parallelism degree of the record parallelization is not performed, and the schedule of 1201 is output as the optimal schedule.

The processing server allocation processing (S606) of the division parallel application determination processing flow 600 is processing for determining the allocation of the processing server in which the processing cost becomes minimum in the execution of the task schedule calculated up to the recalculation processing (S605). Details and examples of the processing server allocation processing (S606) will be described with reference to FIGS. 7 and 8.

For example, in the case where a processing server of 8 cores (corresponding to the migration processing execution computer 135) is allocated to the processing scheduled in 6 parallel, there is a difference between the processing time of the task allocated to each core and the processing cost of 2 cores that do not operate, and thus, the core that finishes the useless processing is required to stand by until the processing of the core having the longest processing time is finished, and becomes the extra cost.

In addition, although it takes time to activate the processing server, a fee is also generated during that time. Consequently, when the activation of the processing server of another size is frequently performed depending on a time period, an excessive fee is applied accordingly. Accordingly, it is necessary to allocate the processing server so as not to generate an extra core standby time and to reduce activation overhead.

FIG. 7 is a flowchart illustrating a detailed procedure example of the processing server allocation processing (S606) of the division parallel application determination processing flow 600.

Figure 8:
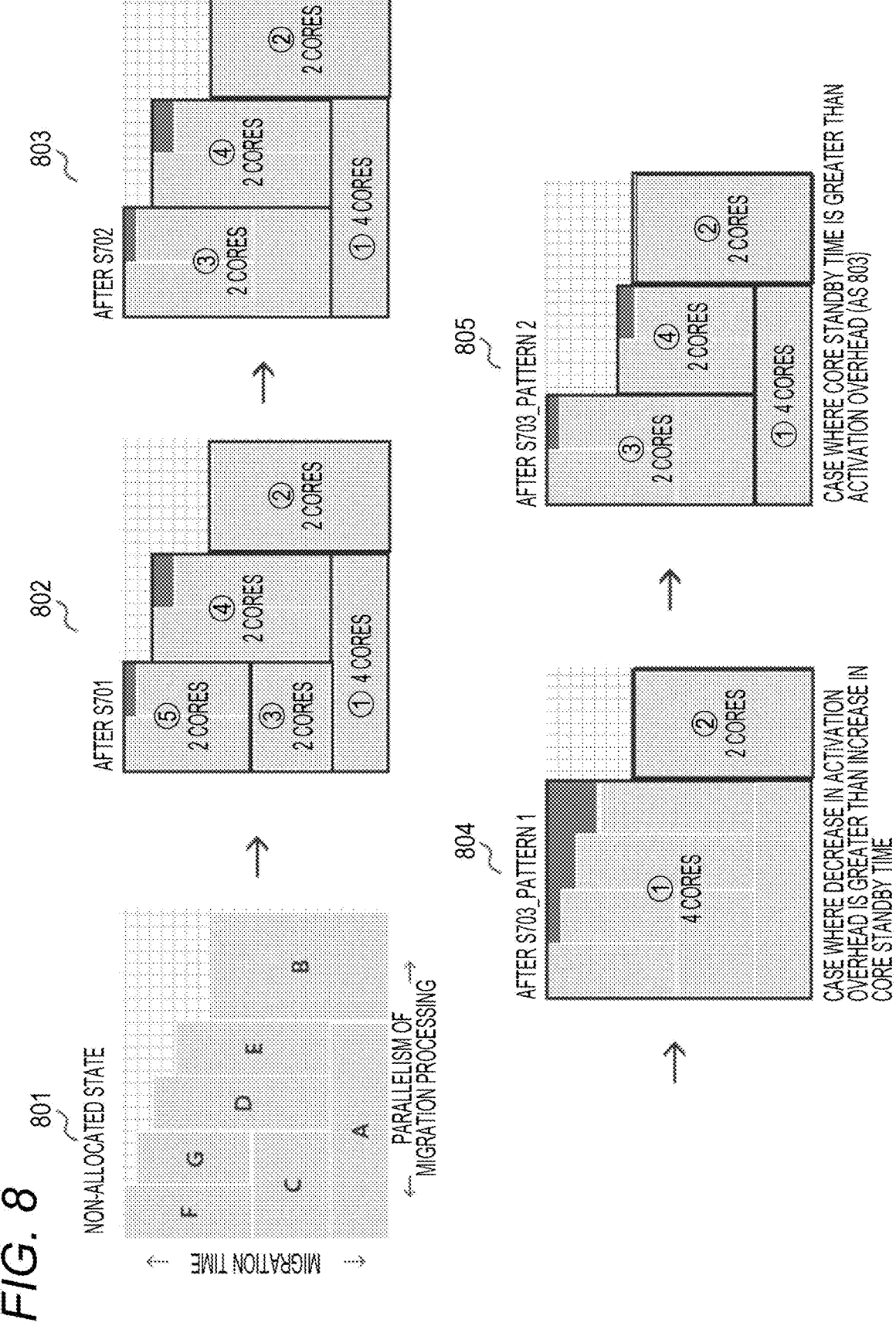
FIG. 8 is a conceptual diagram illustrating an execution example of the processing server allocation processing.

In FIG. 7, the management computer executes initial allocation processing (S701), same-size processing server integration processing (S702), different-size processing size processing server integration processing (S703), and fee calculation processing (S704). A processing server allocation processing flow 700 may include other processing steps (not illustrated). In addition, FIG. 8 is a view illustrating the state in which the processing server allocation processing flow 700 is applied to the task schedule in which seven tables of A to G are processed in 6 parallel to determine the allocation of the processing servers. The state before the server allocation processing is 801 in FIG. 8.

In the initial allocation processing (S701) of the processing server allocation processing flow 700, the processing server having the finest granularity is allocated. The processing server is allocated 1:1 to the table to which the record parallelization is applied, and processing servers of two cores are sequentially allocated to other table groups. An allocation example of the processing server after the execution of the initial allocation processing (S701) is 802 in FIG. 8.

In the same-size processing server integration processing (S702) of the processing server allocation processing flow 700, when the processing servers of the same size are consecutively allocated, the processing allocations are integrated into one processing server. 803 in FIG. 8 denotes a server allocation example after the execution of the same-size processing server integration processing (S702). In 802 of FIG. 8, (3) the allocation of two cores and (5) the allocation of two cores are continuous, but it can be seen that they are integrated into one of (3) two cores in 803 of FIG. 8.

The different-size processing size processing server integration processing (S703) of the processing server allocation processing flow 700 is processing for determining the allocation by performing integration determination of the processing servers of consecutive different sizes. In the case of integration into a large processing server, the core standby time of the processing server increases, but the activation overhead of the subsequent processing server can be reduced.

804 in FIG. 8 is a view illustrating the case where the subsequent small processing server is integrated as a result of the determination in which the activation overhead of the subsequent processing server is greater than the increase in the core standby time. 805 in FIG. 8 is a view illustrating the case where the subsequent small processing server is integrated as a result of the determination in which the increase in the core standby time is greater than the decrease in activation overhead of the subsequent small processing server.

In the fee calculation processing (S704) of the processing server allocation processing flow 700, the additional fee generated in the data migration processing is calculated using the allocation of the processing server finally determined in the different-size processing size processing server integration processing (S703) and instance fee information (not illustrated).

Figure 9:
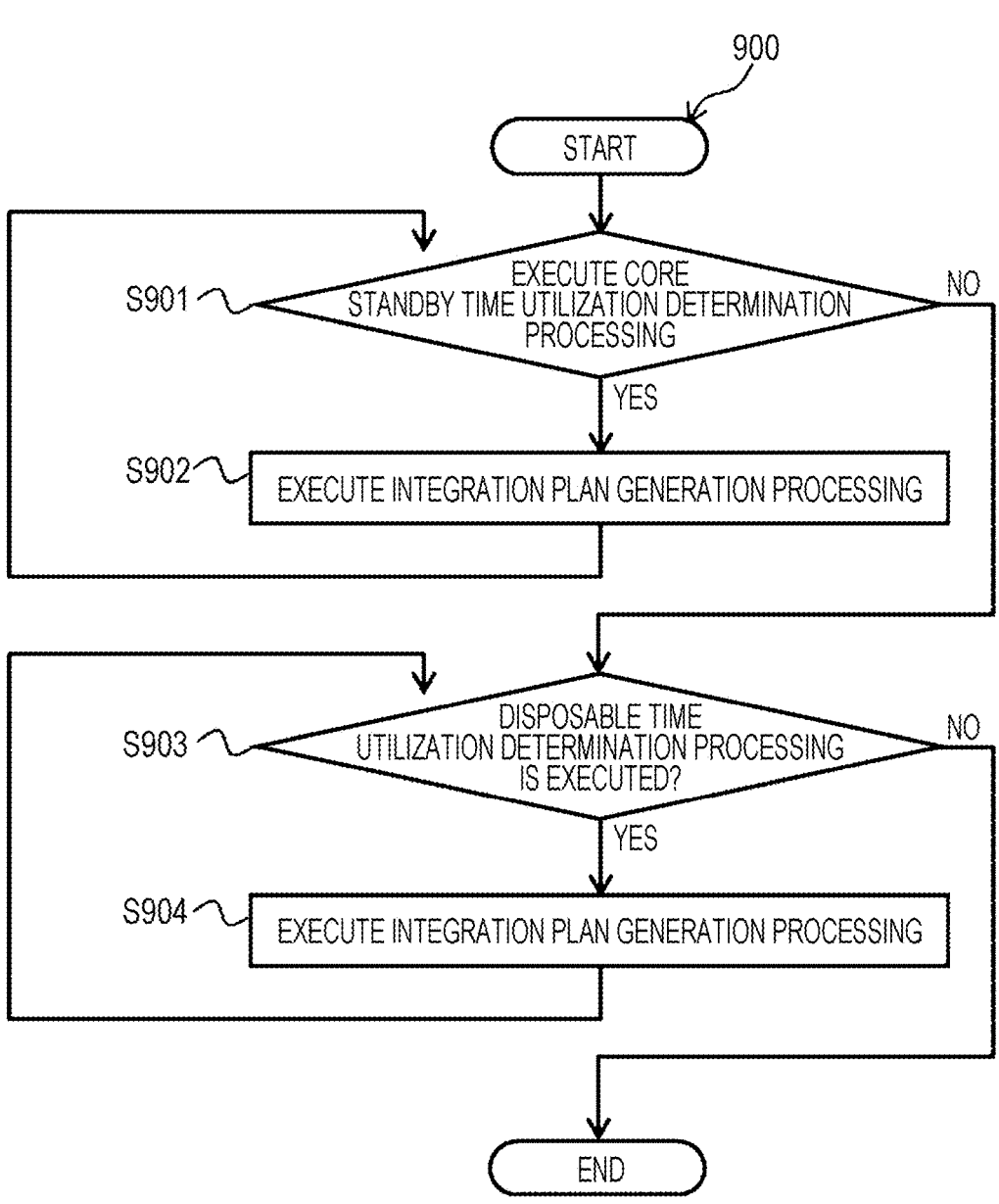
FIG. 9 is a flowchart illustrating a procedure example of processing server integration determination processing.

FIG. 9 is a flowchart illustrating a detailed procedure example of the processing server integration determination processing (S406) of the processing plan generation processing flow 400. In FIG. 9, the management computer 101 executes core standby time utilization determination processing (S901), integration plan generation processing (S902), disposable time utilization determination processing (S903), and integration plan generation processing (S904). A processing server integration determination processing flow 900 may include processing steps (not illustrated) other than these, or some of them may not be executed.

An object of the processing server integration determination processing flow 900 is to reduce the operation time of the processing server and reduce the cost charged to the processing server as illustrated in 1003 of FIG. 10 and 1103 of FIG. 11. The processing time is shortened by processing the task allocated to another processing server with the core standby time of the processing server having the largest core standby time, and the processing across the plurality of processing servers is integrated so as to be processed by the single processing server within the range in which the entire processing completion time is not degraded, whereby the cost is reduced by reducing the activation overhead of the processing server. The cost reduction of the processing server also leads to reduction of power required for the operation of the processing server, leading to environmental conservation.

In the core standby time utilization determination processing (S901) of the processing server integration determination processing flow 900, the core standby time of each processing server defined by the processing schedule generated in the division parallel application determination processing (S405) of the processing plan generation processing flow 400 is computed, the processing server having the largest core standby time is selected, it is determined whether the task scheduled to be processed in another core falls within the core standby time and the operation time of the processing server originally scheduled to be processed can be reduced, and the processing of the task is changed to the processing server having the largest core standby time when the operation time of the processing server originally scheduled to be processed can be reduced.

For example, in 1002 of FIG. 10, it can be determined that the core standby time of the 8-core processing server on the left side is the maximum, and it can be determined that the table in which the processing time is 1, 1, 0.5, and 0.5 falls within the core standby time of the 8-core processing server among the tasks to be processed by the 4-core processing server. In 1102 of FIG. 11, it can be determined that the core standby time of the 2-core processing server that performs the processing of the table with the indivisible processing time of 8 is maximized, and it can be determined that the processing of the tables in which the processing times are 1.5, 1, 1, 1, 1, and 0.5 among the tasks to be processed by other processing servers falls within the core standby time.

Figure 13:
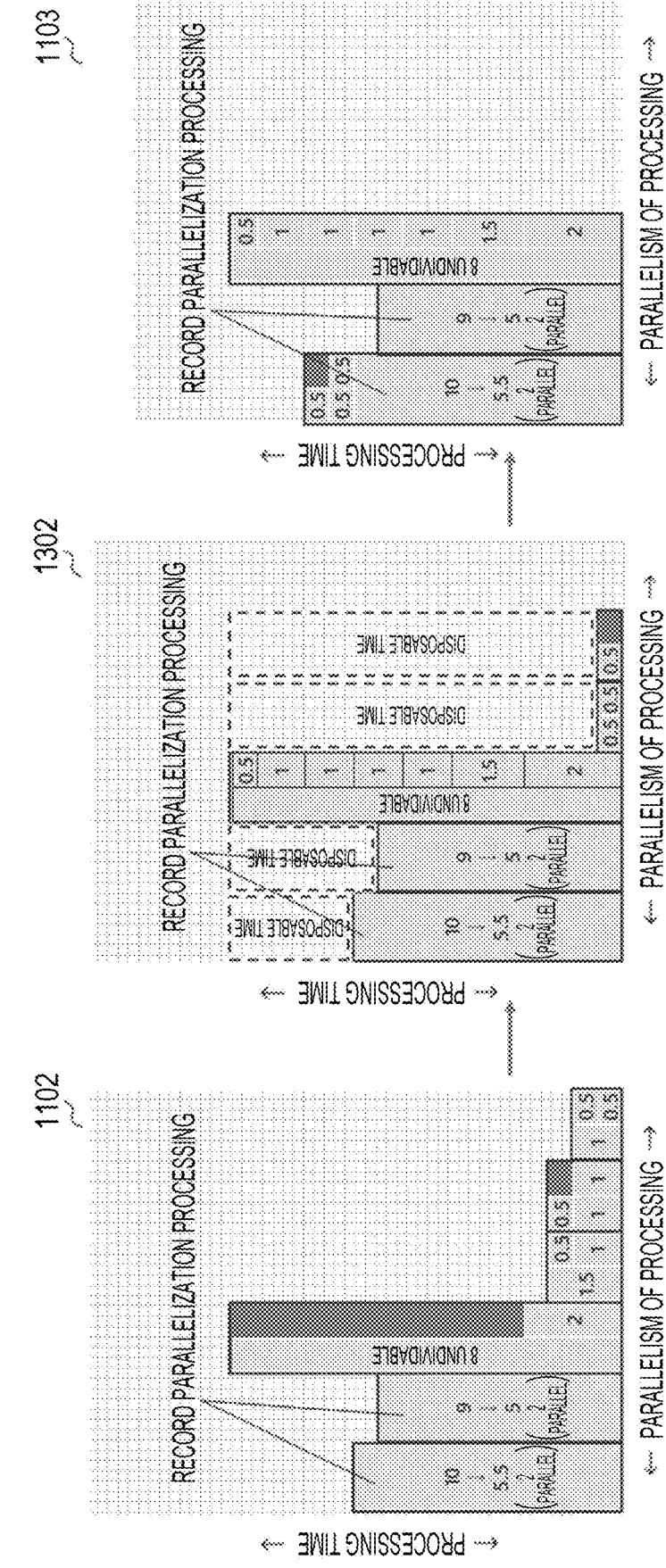
FIG. 13 is a view illustrating an example of intermediate data of a processing server integration determination processing flow.

The integration plan generation processing (S902) of the processing server integration determination processing flow 900 is processing for generating a plan in which the table group determined to be integratable in the core standby time utilization determination processing (S901) is allocated to the processing server as the integration destination. 1003 in FIG. 10 denotes processing generated by the integration plan generation processing (S902). The state illustrated in 1301 of FIG. 13 is an intermediate between 1102 and 1103 in FIG. 11, and is the processing schedule generated in the state where the core standby time utilization determination processing (S901) and the integration plan generation processing (S902) are executed only once.

In the processing server integration determination processing flow 900, the core standby time utilization determination processing (S901) and the integration plan generation processing (S902) of the processing server integration determination processing flow 900 are recursively called and processed, and the disposable time determination processing (S903) is executed when the core standby time cannot be further shortened.

The disposable time utilization determination processing (S903) of the processing server integration determination processing flow 900 is processing in which a certain processing server processes the task scheduled to be processed by another processing server at a time of the difference between the processing time of the certain processing server and the processing time from the processing server having the longest processing time, thereby determining whether the operation time of the processing server originally scheduled to be processed can be shortened. When the plurality of processing servers exist, the determination may be made in ascending order of the disposable time. In 1302 of FIG. 13, the disposal time of the processing server of the two cores on the leftmost side is the smallest, and it can be determined that the operation time of the processing server of the rightmost side and the second processing server from the right side of 1302 can be made zero by integrating the tasks to be processed in the processing server of the rightmost side and the second processing server from the right side of 1302 at the disposal time.

The integration plan generation processing (S904) of the processing server integration determination processing flow 900 is processing for generating the plan in which the processing of the table group determined to be integratable in the disposable time utilization determination processing (S903) is allocated by the processing server as an integration destination. The state illustrated in 1103 of FIG. 11 (1103 of FIG. 13 is the same view) is the processing schedule generated by the integration plan generation processing (S904).

As described above, according to the first embodiment, the management computer 101 can calculate the processing time of the table that is the migration target data and the parallelism degree of the migration processing from the pieces of input information of the connection information about the migration source database and the connection information about the migration destination database, shorten the processing time by combining the record parallelization and the table parallelization, determine the allocation of the processing server to perform the migration processing while considering the fee of the migration processing server, and execute the data migration processing.

As described above, the computer system of the first embodiment includes the processor 111, the storage device 112, and the input/output device 113, the storage device 112 stores at least the evaluation value table 116 indicating the evaluation value for the migration processing computer that executes the migration processing, the input/output device 113 receives the connection information about the data between the migration source and the migration destination, the processor 111 calculates the processing time of the data and the resource amount to be used using the data connection information between the migration source and the migration destination and the evaluation value table 116, computes the processing schedule that shortens the processing time by combining the record parallelization and the table parallelization in consideration of the constraint of the migration processing execution computer 135 stored in the evaluation value table 116, and determines the processing plan by calculating the allocation of the migration processing execution computer 135 executing the processing schedule that can reduce the excessive cost, and the input/output device 113 outputs the determined processing plan.

Therefore, the computer system of the first embodiment can search for the task schedule in which the record parallelization and the table parallelization that reduce the processing time are appropriately combined under the constraint of the processing server, and determine the allocation of the task to the processing server reducing the cost, so that formulation of the appropriate processing plan of the data migration can be supported.

Furthermore, the input/output device 113 receives the execution instruction of the processing plan, and the processor 111 performs execution instruction processing of the migration processing execution computer 135. Therefore, the data migration job can be easily executed.

As described above, according to the first embodiment, the management computer 101 can calculate the processing time of the table that ta the migration target data and the parallelism degree of the migration processing from the pieces of input information of the connection information about the migration source database and the connection information about the migration destination database, shorten the processing time by combining the record parallelization and the table parallelization, determine the allocation of the processing server to perform the migration processing while considering the fee of the migration processing server, and execute the data migration processing.

As described above, according to the first embodiment, the shortening of the processing time by parallelizing the processing in consideration of the overhead of the increase in the processing time caused by the division of the task and the range of the load applied to the system and the scheduling in which the additional fee volume-charged to the on-demand cloud resource that executes the task is prevented can be supported.

Second Embodiment

FIG. 15 is a block diagram illustrating a configuration example of a computer system according to a second embodiment of the present invention.

The computer system of the first embodiment in FIG. 1 exemplifies the case where the processor 111 of the management computer 101 performs the task scheduling of the migrating migration target data 122 stored in the storage device 121 included in the migration source computer 102 to the storage device 132 included in the migration destination computer 131 by the migration processing execution computer 135 that is the on-demand volume-charged cloud resource on the cloud service 103 as the nonstationary processing using the on-demand volume-charged cloud resource.

Figure 14B:
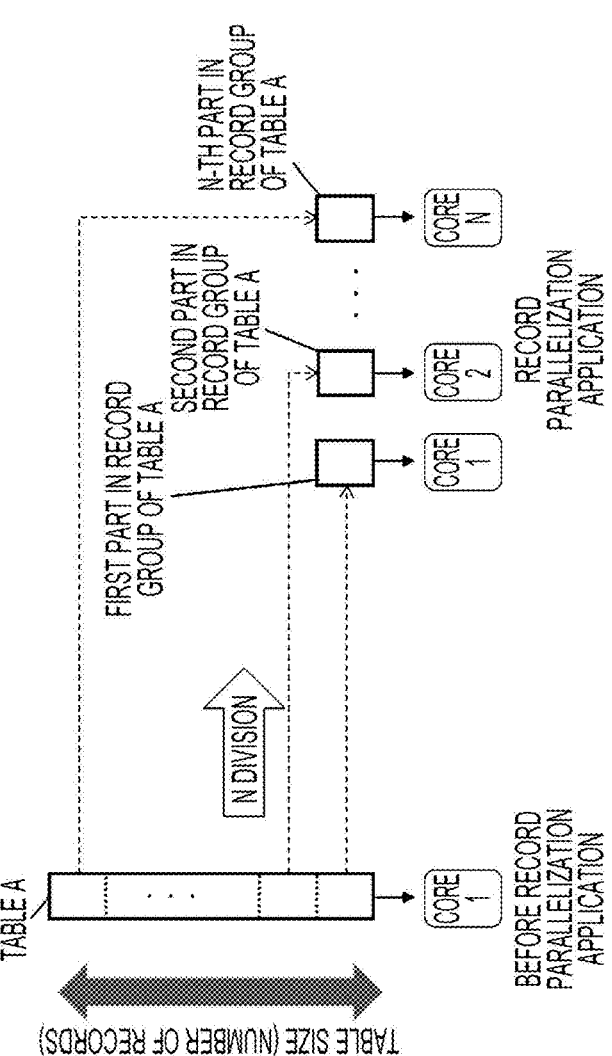
FIGS. 14A and 14B is a view illustrating a relationship between table parallelization and record parallelization.
Figure 14A:
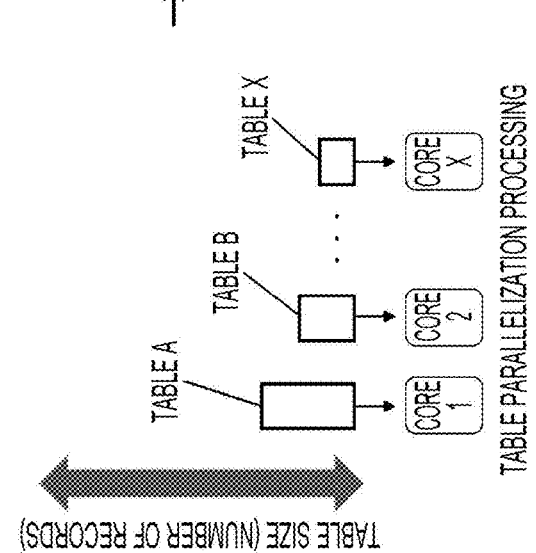

On the other hand, in a computer system of a second embodiment in FIGS. 14A and 14B, the case in which a batch processing execution computer 1235 that is an on-demand volume-charged cloud resource on a cloud service 1203 causes a processor 1211 of a management computer 1201 to perform the scheduling of a batch job of processing target data 1233 in a storage device 1232 included in a computer 1231 as the nonstationary processing using the on-demand volume-charged cloud resource.

The computer system of the second embodiment is a system in which the management computer 1201, the batch processing execution computer 1235 on the cloud service 1203, and the computer 1231 on the cloud service 103 can be mutually connected through a network 1204. Because other configurations are the same as the configuration of the computer system of the first embodiment in FIG. 1, the description thereof will be omitted.

In the second embodiment, in consideration of the overhead of the increase in processing time due to the parallelization in which the task is divided, the task scheduling in which the processing time is shortened is performed by combining the parallelization in units of tasks and the parallelization in which the task is divided. In addition, task allocation to the processing server is performed such that the standby time of the core of the processing server is shortened.

In addition, reallocation of the task is performed by utilizing the standby time of the core of the processing server, and the operation time of the processing server and the activation overhead of the processing server are shortened.

In addition, the reallocation of the task is performed using the disposable time of the processing server, and the operation time of the processing server and the activation overhead of the processing server are shortened. In addition, execution management of the processing server is performed such that the processing server operates according to the calculated task schedule.

According to the second embodiment, it is possible to support the shortening of the processing time by parallelizing the processing in consideration of the overhead of the increase in the processing time caused by the division of the task and the range of the load on the system and the scheduling in which the additional fee volume-charged to the on-demand cloud resource that executes the task is prevented The present invention is not limited to the above examples, but various modifications may be provided. For example, the above embodiments are described in detail in order to explain the present invention in an easy-to-understand manner, and the above embodiments are not necessarily limited to a case including all the described configurations. In addition, the configuration is not limited to the deletion, and the configuration can be replaced or added. For example, task scheduling in data backup may be performed.

What is claimed is:

1. A management computer that executes data processing of processing target data having a plurality of tables using a processing execution computer on a cloud service, the management computer comprising:

a processor;

an input/output device;

a processing plan generation processing unit configured to cause the processor to generate a processing plan that is executed by utilizing an on-demand volume-charged cloud resource using data information input through the input/output device, and cause the input/output device to display the generated processing plan; and a processing plan execution management processing unit configured to cause the processor to perform execution management of the processing execution computer such that the data processing is executed according to the processing plan selected through the input/output device, wherein the processing plan generation processing unit performs table parallelization processing for allocating a plurality of the tables to a core of the processing execution computer, parallelizing the data processing in units of the tables, processing a task in units of the tables, and executing the task by each of the core of the processing execution computer, and when the table is larger than a predetermined data size, performs record parallelization processing for dividing the table having the large data size into a plurality of records, allocating the plurality of records to the core of the processing execution computer, parallelizing the data processing in units of the records, processing the task in units of the records, and executing the task by the core of the processing execution computer.

2. The management computer according to claim 1, wherein the processing execution computer is a migration processing execution computer on the cloud service, the management computer executes data transfer processing of the processing target data from a migration source computer to a migration destination computer on the cloud service using the migration processing execution computer as the data processing, the processing plan generation processing unit causes the processor to generate a processing plan of the data transfer processing that is executed by utilizing the cloud resource based on migration source data connection information and migration destination data connection information input through the input/output device, and the processing plan execution management processing unit causes the processor to perform the execution management of the migration processing execution computer such that the data transfer processing is executed according to the processing plan selected through the input/output device.

3. The management computer according to claim 1, wherein the processing execution computer is a batch processing execution computer on the cloud service, the management computer executes batch processing of the processing target data with respect to a batch computer as the data processing, the processing plan generation processing unit causes the processor to generate a processing plan of the batch processing that is executed by utilizing the cloud resource, and the processing plan execution management processing unit causes the processor to perform the execution management of the batch processing execution computer such that the batch processing is executed according to the processing plan selected through the input/ output device.

4. The management computer according to claim 1, wherein the processing plan generation processing unit is configured to cause the processor to generate the processing plan shortening a processing time of the data processing by combining the table parallelization processing and the record parallelization processing.

5. The management computer according to claim 1, wherein the processing plan generation processing unit is configured to cause the processor to allocate the task to the processing execution computer such that a standby time of the core of the processing execution computer is shortened.

6. The management computer according to claim 5, wherein the processing plan generation processing unit is configured to cause the processor to perform reallocation of the task by utilizing a standby time of the core of the processing execution computer so as to shorten an operation time and an activation overhead of the processing execution computer.

7. The management computer according to claim 1, wherein the processing plan generation processing unit is configured to cause the processor to reallocate the task by utilizing a disposable time of the processing execution computer so as to shorten an operation time and an activation overhead of the processing execution computer.

8. The management computer according to claim 1, wherein the processing plan generation processing unit is configured to cause the processor to determine the table for which a time required for the data processing is longer than a predetermined shortest processing time among the plurality of tables as an application target of the record parallelization.

9. The management computer according to claim 1, wherein the processing plan generation processing unit is configured to cause the processor to select the task that becomes a bottleneck of the processing plan, regenerate the processing plan when the record parallelization in which an increased parallelism degree is applied to the task that becomes the bottleneck, and apply the record parallelization processing in which the parallelism degree is increased to the table that becomes the bottleneck when a processing time and cost of the data processing can be reduced.

10. The management computer according to claim 1, wherein the processing plan generation processing unit is configured to cause the processor to determine allocation of the cores of the processing execution computer such that a processing cost of the data processing is minimized in execution of the processing plan.

11. The management computer according to claim 1, wherein the input/output device includes a processing plan display screen, and displays a graph representing a relationship between a processing time of the data processing and a parallelism degree of processing on the processing plan display screen.

12. A management computing system in which the management computer according to claim 1 and the processing execution computer on the cloud service are connected through a network.

13. A management computing program causing a management computer that executes data processing of processing target data having a plurality of tables using a processing execution computer on a cloud service to execute;

a processing plan generation processing function of generating a processing plan that is executed by utilizing an on-demand volume-charged cloud resource using data information input through an input/output device, and causing the input/output device to display the generated processing plan, and a processing plan execution management processing function of causing a processor to perform execution management of the processing execution computer such that the data processing is executed according to the processing plan selected through the input/output device, and the processing plan generation processing function performs table parallelization processing for allocating a plurality of the tables to a core of the processing execution computer, parallelizing the data processing in units of the tables, processing a task in units of the tables, and executing the task by each of the core of the processing execution computer, and when the table is larger than a predetermined data size, performs record parallelization processing for dividing the table having the large data size into a plurality of records, allocating the plurality of records to the core of the processing execution computer, parallelizing the data processing in units of the records, processing the task in units of the records, and executing the task by the core of the processing execution computer.

14. A management computing method for executing data processing of processing target data having a plurality of tables using a processing execution computer on a cloud service, the management computing method comprising:

a processing plan generation processing step of causing 1 processor to generate a processing plan that is executed by utilizing an on-demand volume-charged cloud resource using data information input through an input/ output device, and cause the input/output device to display the generated processing plan; and a processing plan execution management processing step of causing the processor to perform execution management of the processing execution computer such that the data processing is executed according to the processing plan selected through the input/output device, wherein the processing plan generation processing step performs table parallelization processing for allocating a plurality of the tables to a core of the processing execution computer, parallelizing the data processing in units of the tables, processing a task in units of the tables, and executing the task by each of the core of the processing execution computer, and when the table is larger than a predetermined data size, performs record parallelization processing for dividing the table having the large data size into a plurality of records, allocating the plurality of records to the core of the processing execution computer, parallelizing the data processing in units of the records, processing the task in units of the records, and executing the task by the core of the processing execution computer.

15. The management computer according to claim 4, wherein the processing plan generation processing unit is configured to cause the processor to calculate a processing time of the record parallelization processing in consideration of a temporal overhead generated when the record parallelization processing is applied, wherein the table parallelization processing does not generate the temporal overhead.

16. The management computer according to claim 4, wherein the processing plan generation processing unit is configured to cause the processor to execute the record parallelization processing on a single processing execution computer, and to divide the table parallelization processing into a plurality of processing execution computers for execution.

17. The management computer according to claim 4, wherein the processing plan generation processing unit is configured to cause the processor to set a number of cores included in an instance available as the processing execution computer as a processing parallelism degree of the record parallelization processing.

18. The management computer according to claim 8, wherein the processing plan generation processing unit is configured to cause the processor to determine a minimum parallelism degree in which a processing time when the record parallelization is applied is shorter than the predetermined shortest processing time as a parallelism degree of the record parallelization.

19. The management computer according to claim 8, wherein the processing plan generation processing unit is configured to cause the processor to, when a table to which the record parallelization cannot be applied exists among the plurality of tables, define a processing time of the table to which the record parallelization cannot be applied as a theoretically fastest processing time.

20. The management computer according to claim 8, wherein the processing plan generation processing unit is configured to cause the processor to determine a parallelism degree of the record parallelization with a candidate based on a support size stored in an evaluation value table, with a value of a processing parallelism degree calculated based on a resource upper limit as an upper limit.

* * * * *